3,260,737
N-BETA-CYANOETHYL-N-LOWER ALKYL-ALPHA-CYANO-CINNAMO-NITRILE, CINNAMATE AND CINNAMIC ACID AMIDE COMPOUNDS
James M. Straley, David J. Wallace, and Max A. Weaver, Kingsport, Tenn., assignors to Eastman Kodak Company, Rochester, N.Y., a corporation of New Jersey
No Drawing. Filed Apr. 3, 1963, Ser. No. 270,144
8 Claims. (Cl. 260—465)

This invention relates to methine compounds containing the cyanomethylidene group and which are particularly useful in dyeing textile materials such as those containing cellulose ester or polyester fibers.

The methine compounds have the following general formula (I)
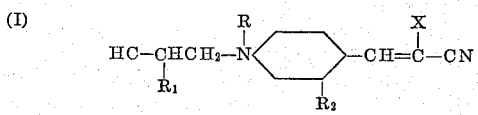

wherein
R and $R_2$ each represents a lower alkyl group, including, for example, methyl, ethyl, straight and branched-chained, proyl and butyl groups;
$R_1$ represents a hydrogen atom or a lower alkyl group,
X represents a Cn, $CONH_2$ or COOY group where Y represents an alkyl group or lower cycyloalkyl group.
Herein, the radical

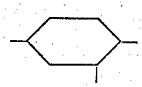

is to be understood as being a phenylene radical.

A particularly efficacious group of methine compounds are those having the above general formula wherein $R_1$ is a hydrogen atom, i.e., the N-cyanoethylamino substituted methine compounds, and especially wherein X is a COOY group in which Y is a carbalkoxy group the alkyl group of which contains a linear chain of 1–6 carbon atoms for example, methyl, ethyl, n-propyl, sec-butyl, n-butyl, n-amyl, n-hexyl and 2-ethylhexyl.

The methine compounds of Formula I above are prepared by condensing nitriles containing an active methylene group, with aldehydes of Formula II according to the following reaction

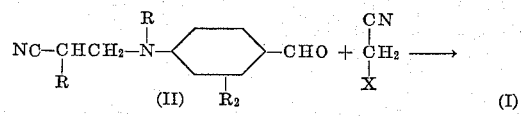

wherein R, $R_1$, $R_2$ and X have the same meaning as given above.

The aldehydes of Formula II are prepared, for example, by reaction of the corresponding N-cyanoalkylanilines with phosphorous oxychloride in the presence of dimethylformamide as described in the processes of U.S. patent application Serial No.257,831, filed February 12, 1963, and illustrated in Example 1 below. The methine compounds are, therefore, characterized by an anilino moiety substituted by the N-alkyl and N-cyanoalkyl groups, the cyanomethylidene group and the alkyl group in the nuclear position ortho to the cyanomethylidene group. This is particularly significant when the compounds are used as dyes because the methine compounds containing this combination of groups exhibit superior dyeing properties, including better tinctorial power and better light-fastness, than similar methine compounds not containing the mentioned combination of groups.

The methine compounds can be used for dyeing textile materials including synthetic polymer fibers, yarns and fabrics giving fast brilliant yellow shades when applied by conventional dyeing methods to polyester fibers. The methine compounds also have good affinity for cellulose ester and polyamide fibers. When the methine compounds are used for deying such hydrophobic materials, they should be free of water-solubilizing groups such as sulfo and carboxyl groups. In general, the dyes have good fastness, for example, to light, washing, gas (atmospheric fumes) and sublimation.

The following examples will serve to illustrate the preparation of representative methine compounds and intermediates of our invention.

EXAMPLE 1

Preparation of the aldehyde.—94 g. of N-β-cyanoethyl-N-ethyl-m-toluidine is dissolved in 100 ml. of dimethylformamide. This solution is stirred and cooled, and 55 ml. $POCl_3$ is added with the temperature maintained at or below 20° C. The reaction mixture is then stirred and heated at stem-bath temperature for 1½ hours. At the end of the heating time the mixture is drowned on ice. Complete solution results. The solution is made basic with aqueous sodium hydroxide. The product p-formyl-N-β-cyanoethyl-N-ethyl-m-toluidine precipitates as an oil which solidifies on standing. The yield is 97 g. (90%), M.P. 55–58°. Upon recrystallizing once from 1:1 ethanol-water, the aldehyde melts at 60–61° C.

EXAMPLE 2

Preparation of the methine compound.—p-Formly-N-β-cyanoethyl-N-ethyl-m-toluidine (2.16 g.), methylcyanoacetate (1.0 g.), and 3 drops of piperidine in 15 ml. of ethanol are stirred and refluxed 3 hours. The reaction mixture is allowed to stand overnight at room temperature, filtered, and the dye cake washed with methanol and dried. The product is yellow and dyes textile fibers a very desirable greenish-yellow shade. Excellent affinity and fastness properties result from dyeing cellulose acetate and polyester fibers with the methine compound.

EXAMPLE 3

A yellow methine dye is made as in Example 2, using an equivalent amount of malononitrile as the active methylene compound instead of methyl cyanoacetate. The dye obtained has uniformly excellent properties when used for dyeing cellulose acetate, polyester, and acrylic fibers.

EXAMPLE 4

The process of Example 2 is repeated except replacing methylcyanoacetate by an equivalent amount of isopropylcyanoacetate. The product dyes cellulose acetate and polyester fibers beautiful greenish-yellow shades.

EXAMPLE 5

The process of Example 2 is repeated except replacing methylcyanoacetate by 2,2 - dimethylbutylcyanoacetate. The product dyes cellulose acetate and polyester fibers beautiful greenish-yellow shades.

EXAMPLE 6

The process of Example 2 is repeated except replacing methylcyanoacetate by sec-butyl cyanoacetate. The product dyes cellulose acetate and polyester fibers beautiful greenish-yellow shades.

EXAMPLE 7

The process of Example 2 is repeated except replacing methylcyanoacetate by cyclohexyl cyanoacetate. The product dyes cellulose acetate and polyester fibers beautiful greenish-yellow shades.

EXAMPLE 8

The process of Example 2 is repeated except replacing methylcyanoacetate by 2-ethylhexylcyanoacetate. The product dyes cellulose acetate and polyester fibers greenish-yellow shades.

EXAMPLE 9

The process of Example 2 is repeated except replacing methylcyanoacetate by cyanoacetamide. The product dyes cellulose acetate and polyester fibers beautiful greenish-yellow shades.

EXAMPLE 10

The process of Example 1 is carried out except replacing N-$\beta$-cyanoethyl-N-ethyl-m-toluidine by N-$\beta$-cyanopropyl-N-ethyl-m-toluidine. A yellow methine compound is obtained by reacting the resulting aldehyde with methylcyanoacetate by the process of Example 2. The product dyes cellulose acetate and polyester fibers beautiful greenish-yellow shades.

The following table may be referred to in reference to Formulas I and II, so as to more clearly understand the structure of the aldehydes and the methine compounds resulting from the processes of Examples 1–10 above.

*Aldehydes and methine compounds, Formulas I and II*

| Example | R | $R_1$ | $R_2$ | X |
|---|---|---|---|---|
| 1 | $C_2H_5$ | H | $CH_3$ | |
| 2 | $C_2H_5$ | H | $CH_3$ | $-COOCH_3$ |
| 3 | $C_2H_5$ | H | $CH_3$ | $-CN$ |
| 4 | $C_2H_5$ | H | $CH_3$ | $-COOCH(CH_3)_2$ |
| 5 | $C_2H_5$ | H | $CH_3$ | $-COOCH_2C(CH_3)_2CH_2CH_3$ |
| 6 | $C_2H_5$ | H | $CH_3$ | $-COOCH(CH_3)CH_2CH_3$ |
| 7 | $C_2H_5$ | H | $CH_3$ | $-COOC_6H_{11}$ |
| 8 | $C_2H_5$ | H | $CH_3$ | $-COOCH_2CH(C_2H_5)CH_2(CH_2)_2CH_3$ |
| 9 | $C_2H_5$ | H | $CH_3$ | $-CONH_2$ |
| 10 | $C_2H_5$ | $CH_3$ | $CH_3$ | $-COOCH_3$ |

The methine compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the methine compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the methine compounds into the spinning dope and spinning the fiber as usual. The methine compounds of our invention have varying utility as dyes. The degree of utility varies for example, depending upon the material being dyed and the formula of the methine compound. Thus, for example, all the dyes will not have the same degree of utility for the same material.

Cellulose esters which can be dyed with the methine compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new methine compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the methine compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Methine compounds having the general formula $$NC-\underset{R_1}{\overset{R}{C}}HCH_2-N-\underset{R_2}{\bigcirc}-CH=\overset{X}{\underset{}{C}}-CN$$

wherein

R and $R_2$ each represents a lower alkyl group, $R_1$ represents a member of the class consisting of hydrogen and lower alkyl groups, X represents a member of the class consisting of CN, $CONH_2$ and COOY radicals in which Y represents a member of the class consisting of lower alkyl and lower cycloalkyl groups.

2. Methine compounds having the formula of claim 1 wherein $R_1$ represents a hydrogen atom and X represents a carbalkoxy group containing a linear chain of from 1–6 carbon atoms.

3. Compounds having the general formula $$NC-\underset{R_1}{\overset{R}{C}}HCH_2-N-\underset{R_2}{\bigcirc}-CHO$$

wherein R and $R_2$ each represents a lower alkyl group and $R_1$ reprents a member of the class consisting of a hydrogen and lower alkyl groups.

4. A methine compound having the formula $$N\equiv CCH_2CH_2\underset{}{\overset{C_2H_5}{\diagdown}}N-\bigcirc-CH=C\underset{CN}{\overset{CN}{\diagup}}$$
$$\underset{CH_3}{}$$

5. A methine compound having the formula
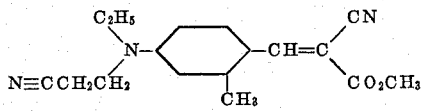
6. A methine compound having the formula
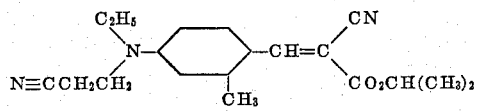
7. A methine compound having the formula
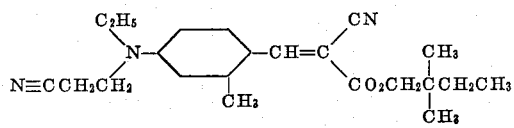
8. A methine compound having the formula
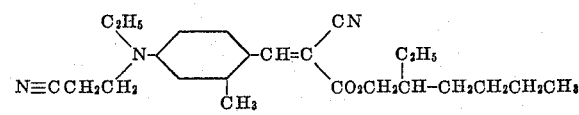
References Cited by the Examiner
UNITED STATES PATENTS
| | | | |
|---|---|---|---|
| 2,230,789 | 2/1941 | Winter et al. | 260—465 |
| 2,292,433 | 8/1942 | Croft | 260—465 |
| 2,456,288 | 12/1948 | Kern | 8—24 |
| 2,726,249 | 12/1955 | Middleton | 260—465 X |
| 2,762,810 | 9/1956 | Heckert | 260—465 X |
| 2,803,640 | 8/1957 | Heckert | 260—465 |
CHARLES B. PARKER, *Primary Examiner.*